United States Patent [19]

Frost et al.

[11] Patent Number: 5,503,369
[45] Date of Patent: Apr. 2, 1996

[54] OPTICAL FIBRE CUSTOMER LEAD IN

[75] Inventors: Peter L. J. Frost, Suffolk; Paul D. Jessop, Essex, both of England

[73] Assignee: British Telecommunications public limited company, London, England

[21] Appl. No.: 230,382

[22] Filed: Apr. 20, 1994

[30]    Foreign Application Priority Data

Mar. 2, 1994 [EP]  European Pat. Off. ............. 94301511

[51] Int. Cl.⁶ .................................................. B65H 59/00
[52] U.S. Cl. ........................................ 254/134.3 FT
[58] Field of Search ..................... 254/134.3 FT,
       254/134.3 R, 389, 415, 394, 325; 242/157 R;
              226/196; 174/68 C, 71 R; 138/92, 103,
              108; 285/16, 17, 127, 177, 179

[56]               References Cited

U.S. PATENT DOCUMENTS

| 3,038,702 | 6/1962 | Trunnell | 254/134.3 FT |
| 3,201,090 | 8/1965 | Jones | 254/134.3 FT |
| 3,306,581 | 2/1967 | Miller | 254/134.3 FT |
| 4,529,171 | 7/1985 | Woodruff | 254/134.3 FT |
| 4,796,865 | 1/1989 | Marchetti | 254/134.3 R |
| 4,951,923 | 8/1990 | Couture | 254/134.3 R |

FOREIGN PATENT DOCUMENTS

| 3530344A1 | 2/1987 | Germany . |
| 3911095A1 | 10/1990 | Germany . |
| 9114452U1 | 4/1992 | Germany . |

*Primary Examiner*—Robert C. Watson
*Attorney, Agent, or Firm*—Nixon & Vanderhye

[57]               ABSTRACT

An optical communications route is provided between the inside of a customer's premises and a node of an optical telecommunications network. An optical fibre transmission line including at least one optical fibre is moved along first and second pre-installed tubular pathways. The first tubular pathway passes from the inside of the customer's premises to the outside thereof via an aperture in a wall of the premises. The second tubular pathway passes from the outside of the premises to the network node. The optical fibre transmission line is fed through the first tubular pathway by a mechanical pushing process, and the optical fibre transmission line is propelled along the second tubular pathway by fluid drag of a gaseous medium passed through the second tubular pathway towards to the network node.

8 Claims, 3 Drawing Sheets

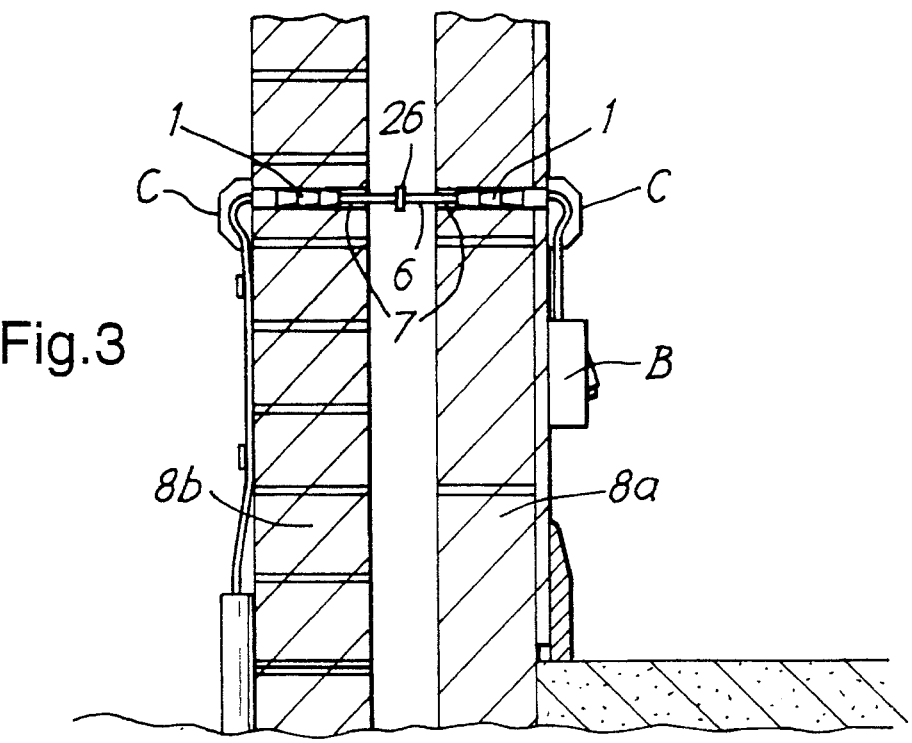
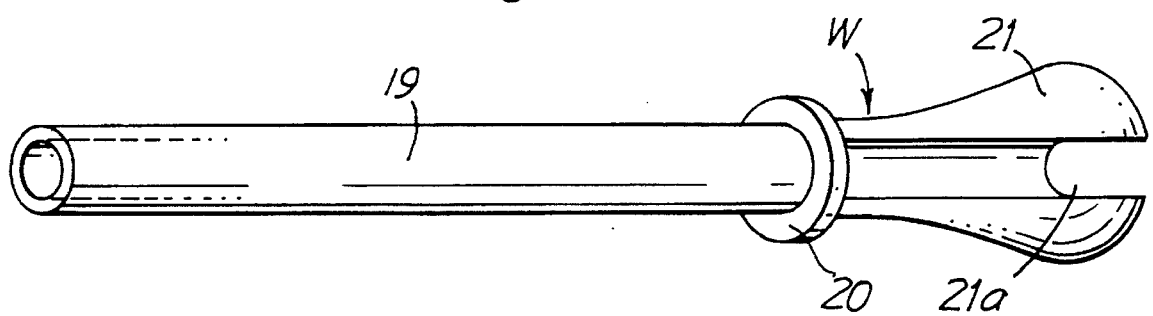
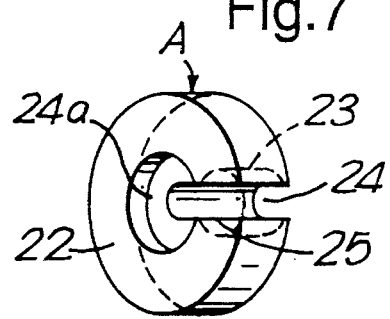
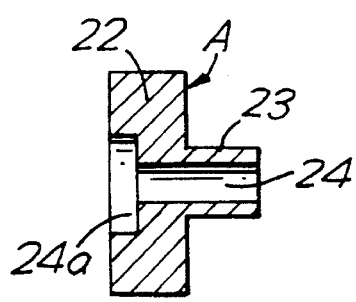

OPTICAL FIBRE CUSTOMER LEAD IN

BACKGROUND OF THE INVENTION

1. Field of the Invention

This invention relates to optical fibre customer lead in (CLI), that is to say to the way in which optical fibres (such as telecommunications optical fibres) are led into customers' premises.

2. Related Art

In the United Kingdom, the telecommunications network includes a trunk network which is substantially completely constituted by optical fibre, and a local access network which is substantially completely constituted by copper pairs. Eventually, it is expected that the entire network, including the access network, will be constituted by fibre.

The ultimate goal is a fixed, resilient, transparent telecommunications infrastructure for the optical access network, with capacity for all foreseeable service requirements. One way of achieving this would be to create a fully-managed fibre network in the form of a thin, widespread overlay for the whole access topography, as this would exploit the existing valuable access network infrastructure. Such a network could be equipped as needs arise, and thereby could result in capital expenditure savings, since the major part of the investment will be the provision of terminal equipment on a 'just in time' basis. It should also enable the rapid provision of extra lines to new or existing customers, and flexible provision or reconfiguration of telephony services.

In order to be completely future proof, the network should be single mode optical fibre, with no bandwidth limiting active electronics within the infrastructure. Consequently, only passive optical networks (PONs) which can offer this total transparency and complete freedom for upgrade, should be considered.

The most common passive optical network is the simplex single star, with point-to-point fibre for each transmit and receive path, from the exchange head end (HE) to the customer network terminating equipment (NTE). Thus, each customer is serviced by a pair of optical fibres. This network design has been used throughout the world and meets all the access criteria. It involves high fibre count cables, and unique electro-optic provision at HE and NTE for each customer.

In order to achieve the goal of providing a fixed, resilient, transparent telecommunications optical fibre access network, it will be important to minimise the installation costs at each part of the network. The present invention is concerned with minimising the cost of installation of fibre from a customer's premises to the nearest network node, and in particular to a cost-effective way of getting fibre into a customer's premises. In this connection, it should be noted that the preferred way of installing fibre is by the well known fibre blowing process (see EP 108590). In this process, fibre units (usually a two-fibre unit for residential premises) is blown through a small diameter (5 mm) polyethylene tube.

The main problem to be overcome in feeding such a tube into a customer's premises arises from the fact that the tube must be fed along the outer wall of the premises and then turned through 90°, so as to pass through a hole formed in the wall, without giving rise to optical loss in the blown-in fibre when it is live.

A known CLI apparatus is constituted by a pair of CLI units, one for fixing to the external surface of a customer's premises wall and one for fixing to the internal surface of that wall. Each of these units is fairly large, as it accommodates a complete loop of tube (fibre), the loop having a radius greater than the minimum bend radius (100 mm) for this type of tube. The hole drilled through the wall between the two CLI units has a fairly large diameter so as to accommodate a bend limiting conduit through which the tube (fibre) passes between the two units. Not only are these CLI units relatively large and require the drilling of a relatively large diameter hole, but they are also expensive and time-consuming to fit. Presently, they are used for business premises CLI, where their cost can be justified by the number of lines normally installed for such premises. For residential customers, however, which usually have only one line, these units are far too expensive. In this connection, it should be noted that there are 14 million residential premises in the United Kingdom.

Another factor which increases the cost of CLI apparatus, is the requirement to provide a gas seal. Thus, the tube (for the blown fibre unit) passes through the wall of a customer's premises, and so would provide a path for the ingress of gases such as natural gas from British Gas pipes (which may pass closely adjacent to the blown fibre tube) or methane (from any source). Building regulations require that residential premises are protected against ingress of such gases. The known type of CLI unit described above incorporates a gas seal constituted by a resin which is injected into the tube at the bottom of the loop. This resin cannot escape as it is setting, as it is at the low point of the loop. Once set, the resin provides an effective seal against the ingress of gases.

SUMMARY OF THE INVENTION

The present invention provides a method of providing an optical communications route between the inside of a customer's premises and a node of an optical telecommunications network, the method comprising the step of moving an optical fibre transmission line comprising at least one optical fibre along first and second pre-installed tubular pathways, the first tubular pathway passing from the inside of the customer's premises to the outside thereof via an aperture in a wall of said premises, and the second tubular pathway passing from the outside of said premises to the network node, wherein the optical fibre transmission line is fed through the first tubular pathway by a mechanical pushing process, and wherein the optical fibre transmission line is propelled along the second tubular pathway by fluid drag of a gaseous medium passed through the second tubular pathway towards the network node.

Advantageously, the mechanical pushing process includes the step of driving the optical fibre transmission line using a pair of counter-rotating drive wheels.

In a preferred embodiment, the method further comprises the step of connecting the optical fibre transmission line to network termination equipment inside the customer's premises. In this case, the optical fibre transmission line may be provided with pre-installed tails, and the connection step is constituted by connecting the pre-installed tails to optoelectronics of the network termination equipment. Alternatively, the optical fibre transmission line may be provided with optical connectors, and the connection step is constituted by connecting the optical connectors to optical connection means of the network termination equipment.

The invention also provides apparatus for feeding an optical fibre transmission line between the inside of a customer's premises and a node of an optical telecommunications network along first and second pre-installed tubular pathways, the first tubular pathway passing from the inside of the customer's premises to the outside thereof via an aperture in a wall of said premises, and the second tubular pathway passing from the outside of said premises to the network node, the optical fibre transmission line comprising at least one optical fibre, the apparatus comprising a mechanical drive for pushing the optical fibre transmission line through the first tubular pathway, and a fibre blowing unit for propelling the optical fibre transmission line along the second tubular pathway by fluid drag of a gaseous medium supplied by the fibre blowing unit so as to pass through the second tubular pathway towards the network node.

The invention further provides a tool for installing an optical fibre transmission line between the inside of a customer's premises and the outside thereof along a pre-installed tubular pathway which passes through an aperture in a wall of said premises, the tool comprising a housing, a motor mounted within the housing, a motor output shaft, and a pair of drive wheels, at least one of the drive wheels being drivably connected to the output shaft of the motor, and the drive wheels being mounted on the housing for relative movement towards/away from one another, whereby the optical fibre transmission line can be driven along the tubular pathway by the inter-engagement of the counter-rotating drive wheels.

Preferably, the tool further comprises a slipping clutch provided between the motor and the output shaft. Advantageously, the motor is provided with gearing for reversing the direction of drive of the output shaft.

The invention further provides a customer lead in unit for guiding an optical fibre transmission line through an aperture in the wall of a customer's premises, the unit comprising a hollow wall plug which is frictionally engageable within said aperture, and a pair of complementary bend control pieces, each bend control piece having a bend control surface formed with a curved bend control groove whose curvature conforms with minimum bend radius requirements for the optical fibre transmission line, the bend control pieces being formed with engagement portions which inter-engage with a complementary engagement portion formed at one end of the wall plug to grip the wall plug between the two bend control pieces, and the bend control grooves being positioned so as to define a bend control channel that is contiguous with the hollow interior of the wall plug when the wall plug is gripped by the two bend control pieces.

Conveniently, a flange formed at said one end of the wall plug constitutes the complementary engagement portion, and each of the bend control pieces is formed with a complementary groove formed in its bend control surface, said grooves constituting the engagement portions.

The invention further provides customer lead in apparatus for guiding an optical fibre transmission line through an aperture in the wall of a customer's premises, the apparatus comprising two customer lead in units each as defined above, one unit being positioned at the mouth of the aperture at the external surface of the wall, the other being positioned at the mouth of the aperture at the internal surface of the wall.

The invention also provides a method of positioning an O-ring around a blown fibre tubing passing through a cavity wall via apertures in the two wall portions defining said cavity wall, the method comprising the steps of positioning the O-ring around the tubing with the O-ring frictionally engaging the tubing, and pushing the O-ring into the cavity between the two wall portions using a hollow mandrel through which the tubing passes.

The invention further provides a tool for positioning an O-ring over blown fibre tubing passing through a cavity wall, the tool comprising a hollow mandrel through which the tubing can pass, a handle, and a collar positioned between the handle and the mandrel, wherein the mandrel has a length such that when the tool is used to push an O-ring over the tube using the method defined above, the O-ring is positioned substantially in the center of the cavity between the two wall portions when the collar engages that surface of the wall adjacent the mouth of the aperture.

Preferably, the O-ring positioning tool further comprises an adapter for engagement with the free end of the mandrel, the adapter being formed with a central bore contiguous with the hollow mandrel, and with a recess in the free end surface thereof, the recess having a depth such that, when the tool is used to tap a wall plug of the customer lead in unit of claim 8 into an aperture in a wall, the free end surface of the adapter engages with the surface of the wall to prevent the flange at said one end portion of the wall plug being driven into the aperture.

BRIEF DESCRIPTION OF THE DRAWINGS

The invention will now be described in greater detail, by way of example, with reference to the accompanying drawings, in which:

FIG. 3 is a cross-section taken through the cavity wall of a telecommunications network customer, and shows two CLI units of the type shown in FIGS. 1 and 2 in place to guide optical fibre into that customer's premises;

FIG. 6 is a perspective view of an O-ring/wall plug insertion tool;

FIG. 7 is a perspective view of an adaptor for use with the tool of FIG. 6;

FIG. 8 is a cross-section taken through the adapter of FIG. 7.

DETAILED DESCRIPTION OF EXEMPLARY EMBODIMENTS

Figure 1:
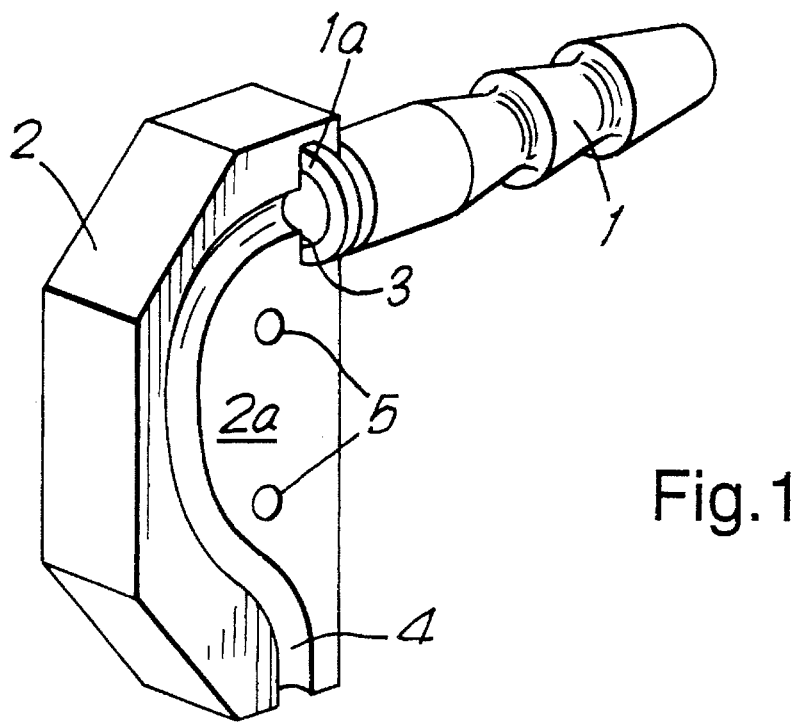
FIG. 1 is a exploded perspective view of a wall plug and a bend control piece of a CLI unit constructed in accordance with the invention.
Figure 2:
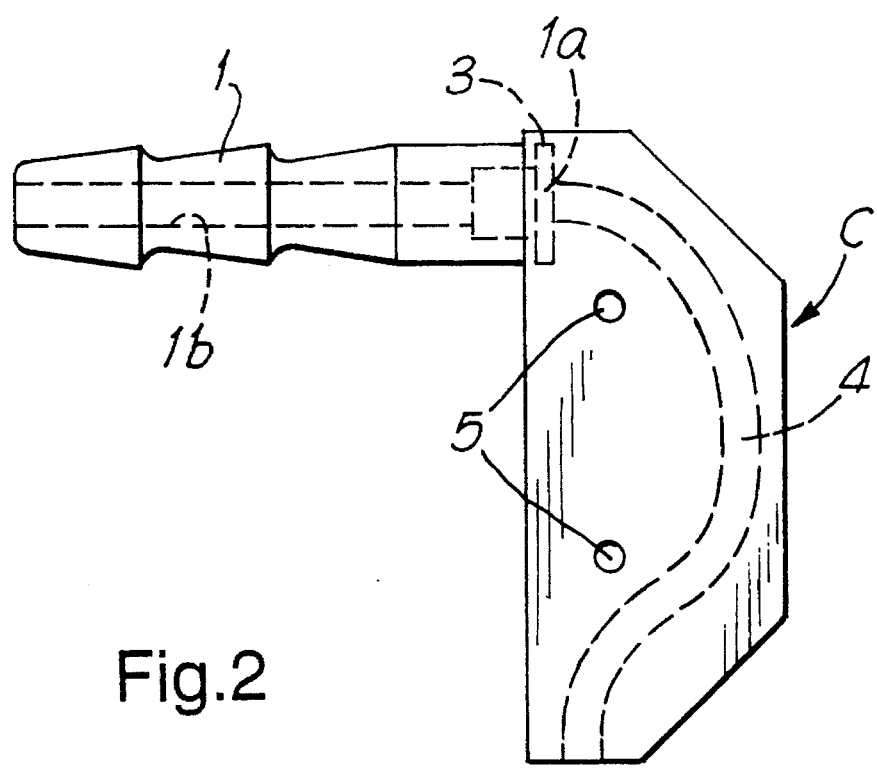
FIG. 2 is a plan view of the CLI unit of FIG. 1.

Referring to the drawings, FIGS. 1 and 2 show a CLI unit C constituted by an externally-fluted wall plug 1 and a pair of complementary bend control pieces 2. In use, the bend control pieces 2 fit together with complementary surfaces 2a thereof in engagement. The wall plug 1 and the two bend control pieces 2 are each moulded from a ultra violet (uv) stable plastics material such as polypropylene. One end of the wall plug 1 is formed with an annular flange 1a, this flange being a mating fit within complementary recesses 3 formed in the surfaces 2a of the bend control pieces 2. The wall plug 1 is formed with an axial bore 1b through which, in use, a tube containing optical fibre can pass. When the CLI unit C is assembled (with the flange 1a of the wall plug 1 positioned within the recesses 3 of the bend control pieces 2, and with the surfaces 2a in face-to-face engagement), the mouth of the bore 1b leads to a curved channel defined by a pair of complementary grooves 4 formed in the surfaces 2a. When in the assembled position, the CLI unit C can be fixed to the wall of a customer's premises by means of screws (not shown) passing through aligned apertures 5 pre-formed in the bend control pieces 2. The screws also act to fix the two bend control pieces 2 together around the flange 1a of the wall plug 1. When fixed to the wall, the engagement of the flange 1a within the recesses 3 holds the wall plug 1 firmly with respect to the bend control pieces 2.

The grooves 4 are such as to curve through 90° with a radius of curvature which is 30 mm (that is to say the minimum bend radius for the standard single mode optical fibre normally used for telecommunications). The grooves 4 have a diameter of 5.2 mm so as to accommodate the tubing 6 (see FIG. 3) through which blown fibre is installed. The CLI unit C thus constitutes a simple device for guiding optical fibre through 90° without subjecting that fibre to bends which would cause a significant optical loss.

FIG. 3 shows two CLI units C positioned on opposite sides of an external cavity wall of a customer's premises, the wall plugs 1 of the units frictionally fitting within 13 mm bores 7 drilled in the inner and outer cavity wall portions 8a and 8b respectively. As shown in FIG. 3, the blown fibre tubing 6 passes along the inside surface of the inner cavity wall portion 8a, through each of the CLI units C, and then along the outside surface of the outer cavity wall portion 8b. The tubing 6 can be fixed to the wall portions 8a and 8b by any suitable means.

Figure 4:
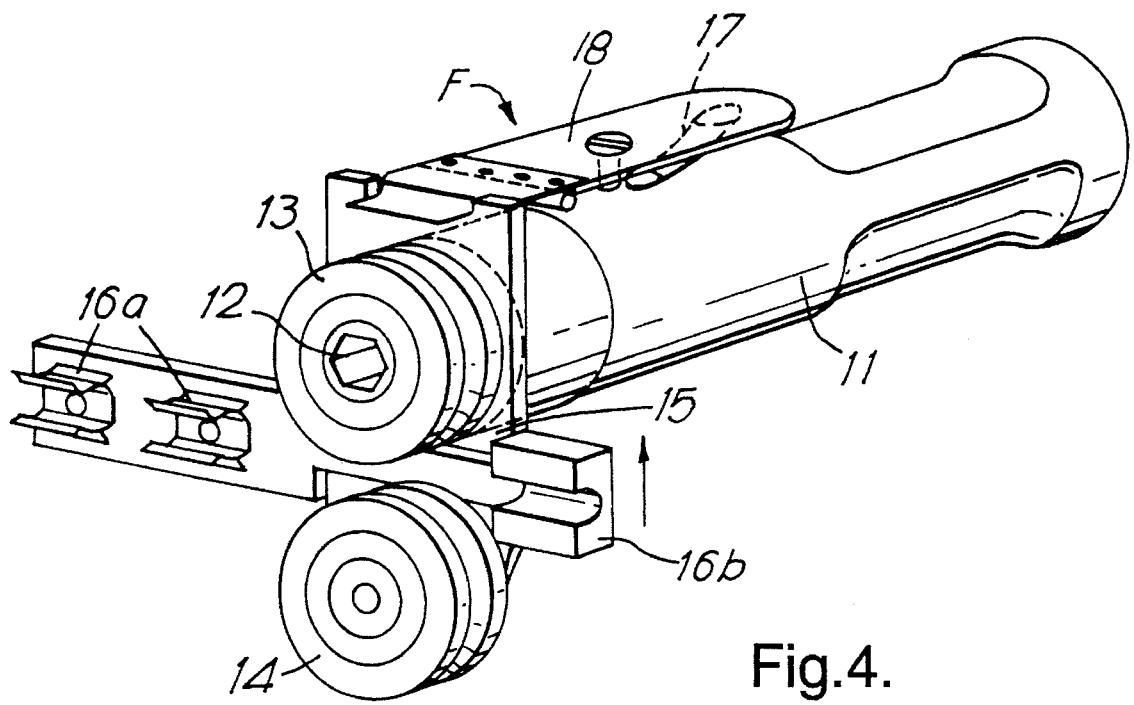
FIG. 4 is a perspective view of a fibre insertion tool.
Figure 5:
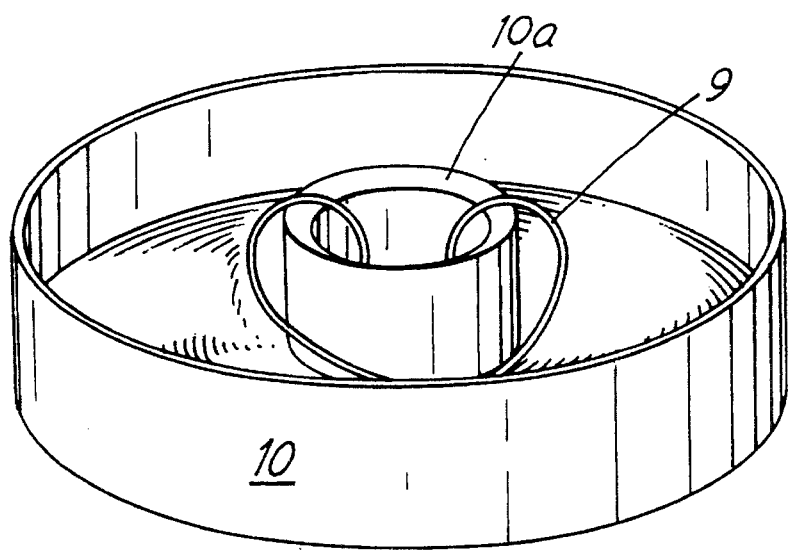
FIG. 5 is a perspective view of a mini pan containing an optical fibre unit.

When connecting a customer to the nearest network node, it is preferably to carry out the blowing of the fibre from outside that customer's premises. In order to provide a complete installation path from the customer's NTE to a network node, therefore, it is necessary to provide a separate means for installation of fibre from the NTE through the pre-installed tubing 6, to the fibre blowing unit positioned outside the customer's premises. FIG. 4 shows a fibre unit installation tool F which can be used for mechanically pushing a fibre unit 9 (typically a four-fibre unit for a residential customer—two of the fibres being for use by the customer, and two being provided as spares) from a mini pan 10 (see FIG. 5). The mini pan 10 is a container in which the fibre unit 9 is coiled round a central boss 10a, the free end of the fibre unit being fed away from the mini pan after passing down through the central boss.

The fibre unit installation tool F is a modified form of electric screwdriver, having a motor and a battery (neither of which is shown) housed in a handle portion 11. The motor drives an output shaft 12 via a factory set slipping clutch (not shown). The output shaft 12 is connected to a drive wheel 13, the drive wheel engaging, in use, with an idler wheel 14 mounted on the unit F by means of a support plate 15. The support plate 15 also supports a pair of tube connector grips 16a and a tube guide 16b, these being positioned respectively at the entry and exit of the nip between the two wheels 13 and 14. The idler wheel 14 is biased towards the drive wheel 13 by means of a spring 17 which acts between the handle portion 11 and a plate 18 which is pivotally mounted on the handle portion and which carries the support plate 15.

In order to feed the fibre unit 9 from the mini pan 10 positioned within a customer's premises, the pre-installed tubing 6 is positioned in the guide 16b. The free end of the fibre unit is then fed to the nip between the two wheels 13 and 14 of the installation tool F. When the tool F is activated, the fibre unit 9 is driven through the nip by the interengagement of the drive wheel 13 and the idler wheel 14, the fibre unit being fed away from the tool via the guide 16b. The free end of the fibre unit 7 is then inserted into the free end of the blown fibre tubing 6 which has already been fed to the outside of the customer's premises via the CLI units C. The tool F is capable of feeding about 10 meters of the fibre unit 9, and so is quite adequate to feed a sufficient length of the fibre unit to a blowing unit positioned outside the customer's premises. The slipping clutch of the tool F limits the torque that the tool can apply, and so protects the fibre unit 9 during the mechanical pushing process. The tool F is also provided with a reversing mechanism, so that it can be used to remove (pull out) the installed fibre unit 9 should the need arise. Once the free end of the fibre unit 9 has been mechanically pushed through the tubing 6 to the outside of the customer's premises, it is then fed into a further blown fibre tubing (not shown) for blowing through to the network node in the normal way. In this connection, it should be noted that the further blown fibre tubing will have already been installed from outside the customer's premises to the network node.

The fibre unit 9 in the mini pan 10 is provided with pre-installed tails (not shown) for termination on customer electronics (not shown). The advantage of this is that, during installation, the installer does not need a specialist splicing kit to connect the optical fibre unit to the customer electronics. The fibre unit 9 is also provided with a stop (not shown) about 100 mm from the pre-installed tails. In use, the stop will engage with the wheels 13 and 14 of the fibre unit installation tool F to prevent the fibre unit being pushed right through the tubing 6.

FIG. 6 shows a wall plug/O-ring installation tool W, the uses of which will be described below. The tool W has a hollow mandrel 19, a collar 20 and a handle 21. The mandrel 19 is made of stainless steel, and both the collar 20 and the handle 21 are made of polyvinylchloride. The mandrel 19 has an internal diameter of 8 mm, an external diameter of 12 mm and a length of 165 mm. The handle 21 is provided with a longitudinally-extending slot 21a which is contiguous with the interior of the hollow mandrel 19. A wall plug adapter A (see FIGS. 7 and 8) is provided for use with the tool W. The adapter A includes a generally cylindrical member 22 having a diameter of 30 mm, and an axially-extending central boss 23 having an outer diameter of 8 mm and an internal diameter of 5.5 mm. A central bore 24 having a diameter of 5.5 mm extends through the member 22 and the boss 23. A longitudinal slot 25 is contiguous with the bore 24, and a recess 24a is formed at the mouth of the bore, the recess having a depth of 4.0 mm and a diameter that matches the outer diameter of each of the wall plugs 1.

The procedure for installing a fibre unit 9 from within a customer's premises to the nearest network node is as follows:

1) A length of blown fibre tubing (the further tubing) is installed between the network node and the external wall of the customer's premises. This tubing can be routed either via a drop cable or underground ducting.
2) The two bores 7 are drilled through the cavity wall portions 8a and 8b from the inside of the premises, and a suitable length of blown fibre tubing (the tubing 6) is pushed through from the inside of the premises to the outside.
3) The external CLI unit C is fitted over the blown fibre tubing 6. To do this, the wall plug 1 is threaded over the free end of the tubing 6, and the wall plug is tapped into the bore 7 using the tool W and the adapter A. In this connection, the adapter A is fitted to the free end of the mandrel 19 of the tool W by engaging the boss 23 thereof within the hollow end of the mandrel. The tubing 6 emerging from the wall plug 1 is threaded through the hollow mandrel 19 and out through the slot 21a in the handle 19. The flanged end portion of the wall plug 1 is then fitted into the enlarged diameter portion 22a of the adapter A, and the wall plug tapped into the bore 7 by hammering against the free end of the handle 19. As the tubing 6 can exit the handle 21 via the slot 21a, this tapping in can be accomplished without damaging the tubing. The wall plug 1 is tapped into the bore 7 until the end face of the adapter member 22 engages the external surface of the outer wall portion 8b. The tool W and the adapter A are then removed. The depth of the enlarged portion of the adapter member 22 is such that the flange 1a at the end of the wall plug 1 projects beyond the external surface of the wall portion 8b sufficiently to permit the bend control pieces 2 to be assembled to the wall plug with their recesses 3 engaging around the flange.

4) The tubing 6 and the tubing leading to the external node are then cut to length ready for connectorisation. A guaranteed seal connector (not shown) may then be used to connect the two lengths of tubing together.

5) An O-ring 26 (see FIG. 3) is then positioned over the tubing 6 within the cavity of the wall using the tool W. In order to insert the O-ring 26, it is positioned around that portion of the tubing 6 which projects into the customer's premises, and the mandrel 17 is pushed into the bore 7 over the tubing 6 from the inside. The tool W is pushed fully into the bore 7 until the collar 18 engages with the internal surface of the inner wall portion 8a. The tool W is then withdrawn, leaving the O-ring 26 in position substantially at the center of the cavity. In this connection, it should be noted that the O-ring 26 has a thickness such that it frictionally engages around the tubing 6. The length of the mandrel 17 (165 mm) is chosen to ensure that the O-ring 26 is positioned substantially centrally, the normal thickness of a cavity wall portion being 112.5 mm, and the gap between the two wall portions being 50 mm. The O-ring 26 is required to prevent the ingress of moisture along the tubing from the outside of the premises to the inside. Once positioned as a friction fit around the tubing 6, any moisture travelling along the tubing from the outside hits the O-ring 26 and drops down into the cavity between the wall portions 8a and 8b.

6) The internal CLI unit is then placed in position. This is accomplished in a similar manner to that in which the external CLI unit C is positioned, that is to say the wall plug 1 is threaded over the free end of the tubing 6, the wall plug is tapped into the bore 7 in the internal wall portion 8a.

7) The fibre unit 9 is then pushed through from the inside of the customer's premises to the outside using the installation tool F. The fibre unit 9 is pushed only as far as the external connector used to connectorise the tubing 6 and the further tubing which extends to the network node.

8) The two bend control pieces 2 of the internal CLI C are then assembled to their tapped-in wall plug 1.

9) The external connector is removed, and the fibre unit is blown along the further tubing to the network node using standard fibre blowing equipment. The external connector is then re-made, and the fibres of the fibre units are spliced to system fibres within the network node.

10) Where the tubing 6 is fixed to the external wall in a generally vertical configuration, two holes are formed in the tubing adjacent to the external CLI unit C using a special tool. A mastic is injected into the lower of these two holes to act as a dam. A two-part resin (sealant) is then injected into the upper of the holes and allowed to set. The mastic dam previously injected into the lower hole prevents the sealant from escaping whilst it sets. Alternatively, where the tubing 6 is led away from the external CLI unit C in a generally horizontal direction, three holes are formed in the tubing adjacent to the CLI unit, mastic is then injected into the two outer holes, and sealant is injected into the central hole. In either case, effective gas blocking is provided to prevent ingress of gases from the outside into the customer's premises.

11) The pre-installed tails of the fibre unit 9 are then terminated on the opto-electronics of the customer's network termination equipment (not shown).

It will be apparent that modifications could be made to the arrangements described above. For example, the pre-installed tails provided on the fibre unit 9 could be replaced by optical connectors which could terminate on an optical connector termination box B (see FIG. 3) positioned conveniently adjacent to the internal CLI C.

We claim:

1. A customer lead in unit for guiding an optical fibre transmission line through an aperture in the wall of a customer's premises, the unit comprising:

a hollow wall plug which is frictionally engageable within said aperture, and a pair of complementary bend control pieces, each bend control piece having a bend control surface formed with a curved bend control groove whose radius of curvature is no less than the minimum bend radius of a predetermined optical fibre transmission line to be used therewith, the bend control pieces being formed with engagement portions which inter-engage with a complementary engagement portion formed at one end of the wall plug to grip the wall plug between the two bend control pieces, and the bend control grooves being positioned so as to define a bend control channel that is contiguous with the hollow interior of the wall plug when the wall plug is gripped by the two bend control pieces.

2. A customer lead in unit as in claim 1, wherein:

a flange formed at said one end of the wall plug constitutes the complementary engagement portion, and each of the bend control pieces is formed with a complementary groove formed in its bend control surface, said grooves constituting the engagement portions.

3. Customer lead in apparatus for guiding an optical fibre transmission line through an aperture in the wall of a customer's premises, the apparatus comprising two customer lead in units, each as in claim 1, one unit being positioned at the mouth of the aperture at the external surface of the wall, the other being positioned at the mouth of the aperture at the internal surface of the wall.

4. A customer lead in unit for providing a channel for an optical fibre transmission line between the interior of an aperture in the wall of a customer's premises and a location external to the aperture, the unit comprising:

a straight tubular wall plug which is frictionally engageable within said aperture, and a pair of complementary bend control pieces, the core of the plug constituting a first portion of said channel, each bend control piece having a bend control surface formed with a curved bend control groove, the bend control pieces being formed with engagement portions which inter-engage with a complementary engagement portion formed at one end of the wall plug to grip the wall plug between the two bend control pieces, and the bend control grooves being positioned and curved so that, when the wall plug is gripped by the two bend control pieces, they define a second portion of said channel which is contiguous with said first portion and which, as it extends away from said first portion, makes angles with said first portion which at first increase and then decrease to finally become substantially equal to 90°.

5. An optical fibre customer lead in unit for permanent installation within an aperture of a predetermined diameter formed in the wall of a customer's premises, said lead-in unit comprising:

a tubular hollow wall plug having an outer diameter sized and shaped to effect a permanent frictional fit within said wall aperture when driven thereinto; and a pair of complementary bend control pieces having complementary first recesses for gripping an end of said wall plug therebetween and complementary second recesses for together defining a curved optical fibre transmission line passageway, with oppositely directed radii of curvature therealong, that is connected to provide a continuation of an aperture passing longitudinally through said wall plug.

6. An optical fibre customer lead in unit as in claim 5 wherein said tubular hollow wall plug has a continuous, non-slotted, side wall extending entirely around at least a portion thereof.

7. An optical fibre customer lead in unit as in claim 5 wherein said tubular hollow wall plug is externally fluted with ridges shaped to help maintain said plug permanently within the wall aperture after initial insertion thereinto.

8. An optical fibre customer lead in unit as in claim 5 wherein the radius of curvature at each location along said second recesses is no less than the minimum bend radius of a predetermined optical fibre transmission line intended for use therewith.

* * * * *